(12) United States Patent
Davis

(10) Patent No.: US 6,980,634 B1
(45) Date of Patent: Dec. 27, 2005

(54) TELEPHONE CIRCUIT CONTROLLER APPARATUS

(76) Inventor: James R Davis, 16 Melanie Dr., Saratoga Springs, NY (US) 12866

( * ) Notice: Subject to any disclaimer, the term of this patent is extended or adjusted under 35 U.S.C. 154(b) by 473 days.

(21) Appl. No.: 10/272,199

(22) Filed: Oct. 16, 2002

(51) Int. Cl.[7] .............................................. H04M 1/00
(52) U.S. Cl. ...................... 379/156; 379/171; 379/383
(58) Field of Search ................................ 379/156, 161, 379/164, 165, 168, 171, 188, 200, 377, 159, 379/383

(56) References Cited

U.S. PATENT DOCUMENTS

| | | | |
|---|---|---|---|
| 835,181 A | 11/1906 | Davidson | |
| 1,145,632 A | 7/1915 | Ude | |
| 2,861,136 A | 11/1958 | Brison | |
| 3,150,237 A | 9/1964 | Baldik et al. | |
| 3,484,561 A * | 12/1969 | Matthews | 379/102.06 |
| 3,941,943 A * | 3/1976 | Matheny | 379/161 |
| 4,203,011 A * | 5/1980 | Coviello | 379/159 |
| 4,273,960 A | 6/1981 | Fahey et al. | |
| 4,613,730 A | 9/1986 | Fechalos et al. | |
| 4,694,483 A * | 9/1987 | Cheung | 379/265.06 |
| 4,805,210 A | 2/1989 | Griffith, Jr. | |
| 5,142,572 A | 8/1992 | Hopkins | |
| 5,390,249 A | 2/1995 | Park | |
| 5,444,772 A * | 8/1995 | Coker | 379/161 |
| 5,537,465 A * | 7/1996 | Bellafiore | 379/157 |
| 5,606,593 A | 2/1997 | Smith | |
| 5,809,132 A | 9/1998 | Sakamoto | |
| 5,978,461 A * | 11/1999 | Anderson | 379/168 |
| 5,978,469 A * | 11/1999 | Benson | 379/377 |
| 6,041,107 A | 3/2000 | Jones et al. | |
| 6,285,755 B1 * | 9/2001 | Watanabe | 379/417 |
| 6,477,248 B1 * | 11/2002 | Bruhnke et al. | 379/399.01 |

* cited by examiner

Primary Examiner—Bing Q. Bui
(74) Attorney, Agent, or Firm—Michael I. Kroll

(57) ABSTRACT

A controller selectively connecting and disconnecting extensions from a telephone line includes a plurality of extension connector ports selectively connected to a communication device and a plurality of relay switches. Each relay switch has three terminals and a toggle movable between connecting the first and second terminals and connecting the first and third terminals. Each first terminal is connected to a respective extension connector port. A processor is connected to an outside telephone line. Entry of a predetermined command code prevents use of the communication device connected to selective toggles. A plurality of tone detector modules each generate a command signal controlling the processor to connect a respective extension to the outside telephone line. A plurality of tone location identifiers are each activated upon receipt of a control signal from the respective tone detector module for generating a unique signal by which the processor distinguishes the extension connector ports.

12 Claims, 11 Drawing Sheets

TELEPHONE CIRCUIT CONTROLLER APPARATUS

BACKGROUND OF THE INVENTION

1. Field of the Invention

The present invention relates generally to telephone systems and, more specifically, to a telephone circuit controller apparatus that enables a subscriber to disconnect one or more telephone extensions thereby freezing up the telephone line for use.

2. Description of Prior Art

Numerous types of telephone controller devices have been provided in the prior art. Typical of these is U.S. Pat. Nos. 835,181; 1,145,632; 2,861,136; 4,805,210; 4,273,960; 4,613,730; 3,150,237; 5,142,572; 5,390,249; 5,606,593; 5,809,132 and 6,041,107 are all illustrative of such prior art. While these units may be suitable for the particular purpose to which they address, they would not be as suitable for the purposes of the present invention as heretofore described.

U.S. Pat. No. 835,181

Inventor: R. A. Davidson

Issued: Nov. 6, 1906

This invention relates to certain new and useful improvements in telephones. The invention has for its object the production of simple, practicable, and efficient means whereby when a subscriber leaves his receiver off the hook through inadvertence a signal is transmitted to the central office. A further object of this invention is to provide means whereby the central office upon receiving such a signal may operate means for automatically opening the talking circuit or opening the signaling circuit to central office, means being also provided whereby said circuit may be automatically closed when the receiver hook is again pressed down or the subscriber attempts to signal the central office.

U.S. Pat. No. 1,145,632

Inventor: W. C. Ude

Issued: Jul. 6, 1915

This invention relates to new and useful improvement in means for controlling telephone circuits. An object of this invention is to provide a telephone fixture with means whereby the operator at the central or sub-station may trip the latch so as to open the circuit. Another object of this invention is to provide telephone fixtures having the usual receiver hook switch which means whereby the operator at the central or sub-station may open the circuit even if the subscriber has failed to return the receiver to the hook and thereby open the circuit.

U.S. Pat. No. 2,861,136

Inventor: J. W. Brison

Issued: Sep. 6, 1983

This invention relates to telephone sets, such as subscribers' station sets, and more particularly to switching means for use in subscriber sets. An object of this invention is to facilitate the clearing of a party line, one telephone set of which has been left in off-hook condition. A feature of this invention resides in switching means operable by the signal bell mechanism of a telephone subscriber's set when the set is in the off-hook condition. The noted switching means is connected so as to open the primary circuit, thereby clearing the busy signal at the central office.

U.S. Pat. No. 3,150,237

Inventor: F. C. Baldik

Issued: Sep. 22, 1964

This invention relates to a line clearing system for use with telephone lines to which more than one telephone is operatively connected but enabling a signal telephone to be operative at one time. The primary object of this invention is to provide a relay device by means of which a centrally dispatched signal may restore operation to the telephone line to which a plurality of party lines are connected by opening the line to the telephone instrument which has been inadvertently uncradled.

U.S. Pat. No. 4,273,960

Inventor: Robert J Fahey

Issued: Jun. 16, 1981

Apparatus for monitoring usage of a telephone connected across tip and ring terminals of a telephone system. The apparatus includes status circuitry operative under microprocessor control to repetitively sample the voltage across the tip and ring terminals and to examine the sampled voltages to determine whether the telephone is in an on/hook condition or an off/hook condition. When the telephone is in an off/hook condition an output of a first value is produced by the status circuitry, and when the telephone is in an on/hook condition an output of a second value is produced by the status circuitry. The microprocessor examines the outputs to detect the occurrence of transitions in the outputs between the first and second values representing transitions between on/hook and off/hook conditions of the telephone. For each detected transition, an activity timer within the microprocessor is set to a count corresponding to a predetermined activity-monitoring time period and decremented at a predetermined rate. In the event the activity timer times out, an alarm condition is produced. Thus, so long as the telephone is used during the activity-monitoring time period an alarm condition will be prevented.

U.S. Pat. No. 4,613,730

Inventor: William A. Fechalos

Issued: Sep. 23, 1986

Automated telephones with electric circuits for outputting dial digit sequences respectively corresponding to different ones of a plurality of user's switches when each switch is momentarily actuated. The circuits permit speed dialing of directory numbers, tandem sequences for accessing outside centers and specific line numbers, and access or feature codes. The apparatus is characterized especially by devices to create automatically loop breaks to simulate either a hook flash or a re-seize on-hook condition in certain circumstances and despite the fact that the telephone remains off-hook. By simple wire connections between a master or "secretary's" telephone and each of the member's phone sets within a limited group, intelligence signals are interchanged to provide "key line group" action without an elaborate, separate "control box" and even though each telephone of the group is served by the central system only via its own two-wire line.

U.S. Pat. No. 4,805,210

Inventor: Herbert L. Griffith, Jr.

Issued: Feb. 14, 1989

Automatic telephone line sharing apparatus is disclosed that will only allow one telephone set or another communication device to be connected to a shared telephone line at a time. Circuits in the apparatus sense when a first one of a plurality of telephone sets or other communication devices is connected to a shared line and causes switches to be operated disconnecting the other telephone sets and devices from the line. When the first set or device disconnects from the shared line, this is sensed and the other sets or devices are automatically reconnected to the shared line. This automatic operation insures exclusive line use by blocking line access by another telephone sets or devices sharing the common telephone line.

U.S. Pat. No. 5,142,572

Inventor: Will Hopkins

Issued: Aug. 25, 1992

A telephone terminal disconnect accessory device for automatically disconnecting or hanging up the telephone at a first telephone terminal station when it is desirable to hold a conversation at a second telephone terminal station without having to return to the first telephone terminal station where the telephone was answered or from which a call was made, the device comprising a housing having at least two female modular jacks disposed in the walls thereof, and including an on/off switching means, a variable timing means, a latching relay means, a reset switching means, and a transistor battery power supply.

U.S. Pat. No. 5,390,249

Inventor: Chung H Park

Issued: Feb. 14, 1995

A telephone communication enable state maintaining circuit is disclosed, and the circuit includes a communication circuit, a communication operating circuit and an operation maintaining circuit. The communication circuit includes contacts and a condenser. The communication operating circuit includes a resistor r.sub. 1, a condenser, a transistor and contacts R.sub.3 a, R.sub.3 b, R.sub.1 a, R.sub.1 b. The operation maintaining circuit includes contacts R.sub.1 c, R.sub.3 c, a resistor r.sub.2, a condenser C.sub.3, and a transistor 7. According to the present invention, telephone calls from the outside can be received, even if the telephone receiver is placed in an abnormal manner.

U.S. Pat. No. 5,606,593

Inventor: David B Smith

Issued: Feb. 25, 1997

An apparatus that, after a time period settable by the user, automatically returns an off-hook telephone to an on-hook condition. This apparatus thus electrically hangs up a telephone handset that is inadvertently left off-hook and allows normal handling of outgoing and incoming calls at other telephone extensions and in some embodiments, even allows calls to ring in to the telephone having the inadvertently off-hook handset. The apparatus also senses when the inadvertently off-hook handset is returned on-hook and rapidly restores the automatic-return-to-an-on-hook condition switch to normal operation.

U.S. Pat. No. 5,809,132

Inventor: Naofumi Sakamoto

Issued: Sep. 15, 1998

A communication terminal device having a line voltage detection circuit 6 connected in parallel with telephone lines 2 is characterized that when either of a built in telephone set 4 or an auxiliary telephone set is off-hooked and then the hook detection circuit OH1/OH2 of the that telephone set 4/5 becomes on-hooked, the true on-off-hook states of that telephone set 4/5 and the branch telephone set 3 are judged by referring to the hook detection circuit OH1/OH2 and the aforementioned line voltage detection circuit 6 after a predetermined time period T has elapsed. The communication terminal device such as a facsimile device and the like having the arrangement described above is able to detect the off-hook/on-hook state of a built in/auxiliary telephone set connected to the telephone lines parallel with a branch telephone set without mistake even if the branch telephone set is off-hooked.

U.S. Pat. No. 6,041,107

Inventor: Eric A. Jones

Issued: Mar. 21, 2000

A computer integrated telephony system embodied in a PC that includes a telephony interface connected to the local loop that detects whether one or more extension phones are off-hook by using the signal generating and detection capabilities found on a typical telephony interface card. In the preferred embodiment, the telephony interface is based on a programmable DSP that generates and injects onto the local loop a subsonic signal having a known shape and amplitude. If one or more extensions are off-hook, the amplitude of the subsonic signal detected on the line will be significantly attenuated. The amplitude of the detected signal is compared against a threshold value and an indication is made if the detected signal amplitude is below the threshold value.

SUMMARY OF THE PRESENT INVENTION

The present invention relates generally to telephone systems and, more specifically, to a telephone circuit controller apparatus that enables a subscriber to disconnect one or more telephone extensions thereby freeing up the telephone line for use.

A primary object of the present invention is to provide a telephone system that will overcome the problems of prior art devices.

A further object of the present invention is to provide a telephone system able to restore a telephone circuit to an on-hook state.

Another object of the present invention is to provide upon entry of a predetermined programming code a telephone system able to restore a telephone circuit to an on-hook state.

A still further object of the present invention is to provide a telephone system able to disable a telephone circuit upon entry of a predetermined programming code.

An even further object of the present invention is to provide a telephone system able to restore a telephone circuit to an on-hook state for emergency use.

A yet further object of the present invention is to provide a telephone system including a parental control for disconnecting a telephone extension.

Another object of the present invention is to provide a telephone system able to ensure uninterrupted telephone conversations.

An even further object of the present invention is to provide a telephone system able to ensure uninterrupted transmission of a facsimile.

Yet another object of the present invention is to provide a telephone system able to unsure uninterrupted data transfer via a computer modem.

A still further object of the present invention is to provide a telephone system able to identify the location of an extension that is currently in an off-hook state.

The present invention overcomes the shortcomings of the prior art by providing means for a subscriber to disconnect selected telephone lines using a preprogrammed code enabling the subscriber to gain access to the line.

Splitting of the incoming telephone line allows a subscriber to have access to a plurality of telephones, facsimiles and computer modems on the same circuit. Though the telephone line allows for a plurality of such devices, the circuit only allows for one of the devices to be used at one time.

Conventionally, a telephone that is in use or off-hook state needs to be manually placed back into an on-hook state before the circuit can be freed for use by another extension. The telephone circuit controller apparatus of the present invention, allows a subscriber to enter a preprogrammed code to disconnect select extensions allowing immediate access to the telephone circuit.

If a telephone extension was in an off-hook state, entry of the programmed code disconnects the extension from the telephone line the circuit is broken and an on-hook state is restored for all other extensions. A dial tone indicating a free circuit is restored to the extension from which the code was entered and the subscriber may proceed with a call.

The present invention controls the circuit by means of a switching relay that is interconnected between the main incoming line and each of the extensions. The switching relays are housed within a telephone circuit controller apparatus that also includes a keypad and microprocessor.

The keypad and microprocessor allow the prescribed user to program codes for controlling the disabling operations with imbedded indicators of degrees of authorization. For instance, codes provided imbedded with a heightened degree of authorization could override, such as a parent's access code, could override a command with a lesser degree of authorization imbedded within, such as a child's command code. Furthermore, codes can be configured to disable all extensions in an emergency situation.

Once the preprogrammed codes have been configured, the codes may be utilized by pressing the code into the keypad of a telephone extension. The circuits of the disabled extensions are restored upon the return of an on-hook state from the telephone extension where the code was entered.

The present invention is particularly useful in overriding an accidental off-hook state extension. In lieu of searching for the offending extension, the user can restore an on-hook state from their current extension. The present invention is also effective for parental control and provides the subscriber the ability to disconnect an overly extended conversation. Another advantage of the present invention is the ability to have a private phone conversation. By disabling extensions prior to making an important telephone call, the subscriber ensures the conversation is not interrupted. An additional advantage of the present invention is preventing disconnection of facsimiles and computer modems ensuring complete data transfer.

A preferred embodiment of the present invention includes a feature that allows a user to determine which extension is in an off-hook state. Upon lifting of a telephone that has been disabled by another extension, a voice message indicates the current extension in the off-hook state.

In the preferred embodiment, the extensions are identified by jack connection at the switching relays housed within a telephone circuit controller apparatus. The keypad and microprocessor allow the subscriber to enter custom identifying names.

An additional embodiment allows further parental control by setting time restraints on selected extensions. The keypad and microprocessor allow the subscriber to program times to disable selected extensions. Thus preventing adolescents from using a telephone or the internet during prohibited hours.

To the accomplishment of the above and related objects, this invention may be embodied in the form illustrated in the accompanying drawings, attention being called to the fact, however, that the drawings are illustrative only, and that changes may be made in the specific construction illustrated and described within the appended claims.

BRIEF DESCRIPTION OF THE DRAWING FIGURES

In order that the invention may be more fully understood, it will now be described, by way of example, with reference to the accompanying drawing in which.

Figure 1:
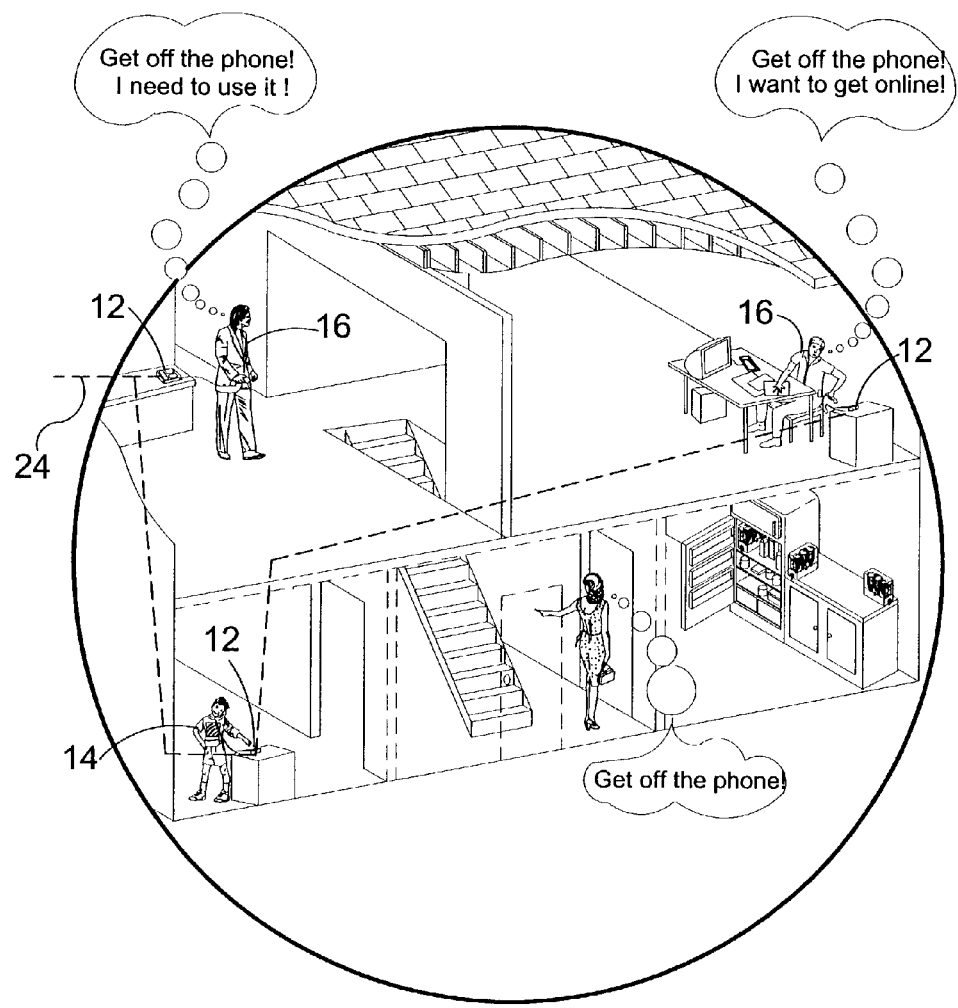
FIG. 1 is an illustrative view of occupant's of a household equipped with prior art devices preventing the occupants from accessing a telephone line because it is occupied by one user.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

DESCRIPTION OF THE REFERANCE NUMERALS

Turning now descriptively to the drawings, in which similar reference characters denote similar elements throughout the several views, the Figures illustrate the circuit board of the present invention. With regard to the reference numbers used, the following numbering is used throughout the various Figures.

10 telephone circuit controller apparatus of the present invention
12 an extension of a main outside line
14 an occupied extension main housing unit
16 a user
18 telephone
19 telephone keypad
20 code keypad
21 receiver
22 extension connector port
24 outside-line
26 extension line
28 on-hook position
30 off-hook position
32 receiver
34 hook switch
36 programmer
38 computer
40 exclusive user
42 relay switch
44 tone detector module
46 processor
48 timer
50 alarm
52 tone location identifier

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize that numerous other embodiments may be used as well. For a definition of the complete scope of the invention, the reader is directed to the appended claims.

Turning now descriptively to the drawings, in which similar characters denote similar elements throughout the several views, FIGS. 1 through 11 illustrate the telephone circuit controller apparatus of the present invention by the numeral 10.

FIG. 1 is an illustrative view of a household equipped with conventional telephone line access devices. Use of one device within the household prevents other occupants or devices from accessing the outside telephone line 24. Use of the telephone line by one user occupies the line and prevents additional access. As illustrated in this figure, a family home with a plurality of telephone extensions 12 connected to one outside line 24 can create confrontational issues among the occupants of a household. An occupied extension 14 prevents others from accessing an outside-line 24 from a different extension 12. The outside-line 24 is inaccessible until the user of the occupied extension 14 terminates use by hanging up the phone. A user 16 of a disabled extension is unaware of exactly which extension 12 is preventing access to an outside line 24 because the plurality of extensions are in various rooms spread throughout the household beyond visual range. In addition to desired users 16 being restricted from use, the user of the occupied extension 14 is vulnerable to interruption by others within the household. Thus, when one person is using the phone line, other users 16 are prevented from making an important business call, downloading a computer file via modem or sending or receiving a facsimile while another user occupies the outside-line 24. The outside line 24 may then be tied up for an unlimited amount of time and at a location unaware to others until found through unnecessarily, aggravating discussion while the current user 14 is continually disrupted with pleads for access to an outside line.

Figure 2:
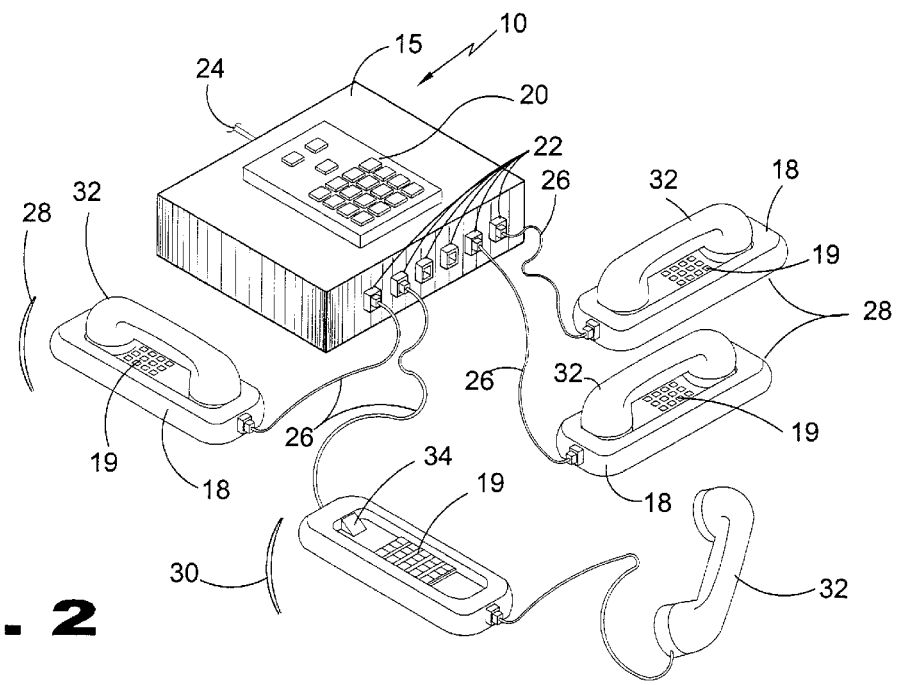
FIG. 2 is a perspective view of the main unit of telephone circuit controller apparatus of the present invention connected to a plurality of communication devices.

FIG. 2 is a perspective view of the telephone circuit controller apparatus of the present invention 10 connected to multiple telephones 18. The telephone circuit controller apparatus of the present invention 10 includes main housing unit 15. On the main unit 15 is a code keypad 20. The code keypad 20 preferably contains number keys 0–9, a "*" key and a "#" key similar to a standard telephone keypad 19. Additionally, a plurality of extension connector ports 22 are provided on the main housing unit 15. Each extension connector port 22 allows for connecting a telephone 18 to the main outside-line 24. Each extension connector port 22 is connected to a communication device, such as a telephone 18 modem or fax machine (not illustrated), via an extension line 26. Shown in this figure are three phones 18 in the on-hook position 28 and one telephone 18 in the off-hook position 30. Each telephone 18 is connected to a respective extension connector port 22. The on-hook position 28 is the normal resting position of a telephone 18 in anticipation of an incoming call or before placement of an outgoing call. The off-hook position 30 releases the receiver 32 from the hook switch 34 providing the telephone 18 with access to the main outside-line 24 if not previously disabled by entry of program code on the code-keypad 20 or via a telephone-keypad 19 to the telephone circuit controller apparatus 10.

Figure 3:
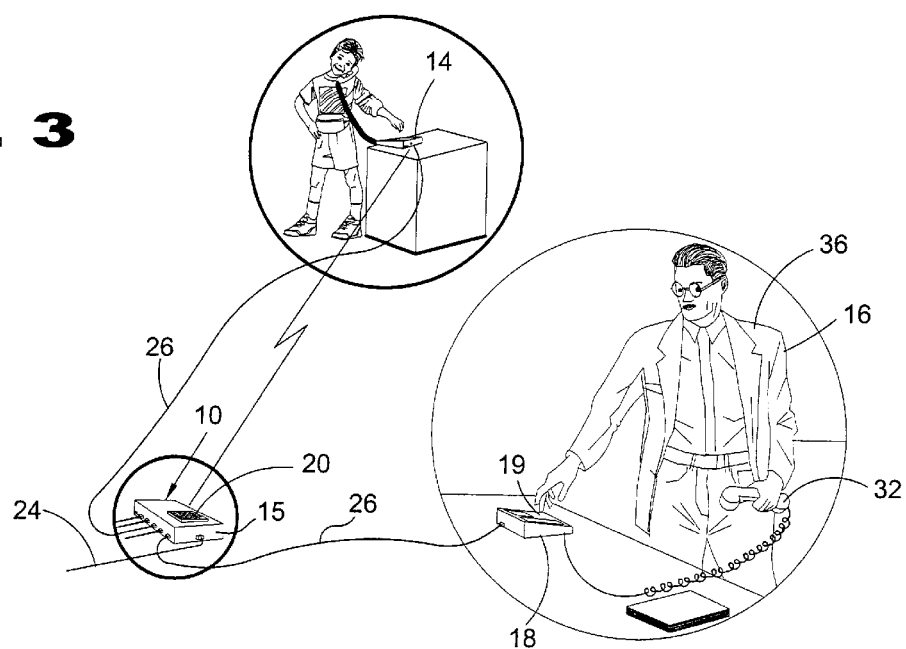
FIG. 3 is an illustrative view of the telephone circuit controller apparatus of the present invention in use disabling access to an outside line by an occupied extension in order to clear the line for use by an otherwise disabled user.

FIG. 3 is an illustrative view showing the telephone circuit controller apparatus disabling access to an outside line 24 by an occupied telephone extension 14. Disabling access to the telephone line by other telephone lines clears the line for use via an enabled line. The telephone circuit controller apparatus 10 allows a programmer 36 to control the use of phones connected thereto by entry of a program command code on the keypad of the telephone. Various controlling functions may be programmed into the main unit by entering codes into the code-keypad 20. Once program codes are established, code entry may be entered at any communication device connected to an extension connector port 22.

One such controlling function is the disabling of an occupied extension 14 by entering a predetermined disabling command code. Illustrated is a child using a telephone 18 connected to the extension connector port 22 of the main unit 15. An adult, with knowledge of the disabling codes, enters a disabling command code into the telephone keypad 19. This provides the programmer 36, in this instance the adult user, accesses to an outside phone line 24 by instantaneously disabling all other extensions. Once the programmer 36 terminates use by placing the telephone in the on-hook position 28 all extensions will be reconnected to the outside line 24, thus, allowing access to the telephone line on a first come first serve basis.

An alternative to instantaneous disconnection by entry of a disabling command code is to accompany the disabling command with a timing function. The timing function counts a designated time entered by the programmer 36. At the expiration of the specified time allowance, the user is issued an audible alarm and given an additional time period to terminate use of the telephone line before manual disconnection by the telephone circuit controller apparatus 10. Additionally, a timing function may be programmed to grant particular users time limitations on outgoing calls. This is possible by providing each user a personal program code. Each code will provide restricted access to the telephone line based upon the status of the user of the code. Such restricted access includes but is not limited to restricted times for phone use, and limitations on call durations.

Entry of a privacy command code before placing a call disables all other extensions from the outside line 24. Thus, interference from users at other extensions 12 is prevented. However, certain priority codes may be overridden by a code entered by a user with a higher priority. For example, as illustrated in FIG. 3, suppose a child user, has entered a privacy command code, an adult user can override the privacy code with a disabling command code if the personal user codes have been employed. Overriding child-entered codes prevents children from using the phone for extensive time periods or at unsightly hours while providing adults access to a dial tone. Overriding program codes may also restrict any undesired user from accessing the telephone line.

Figure 4:
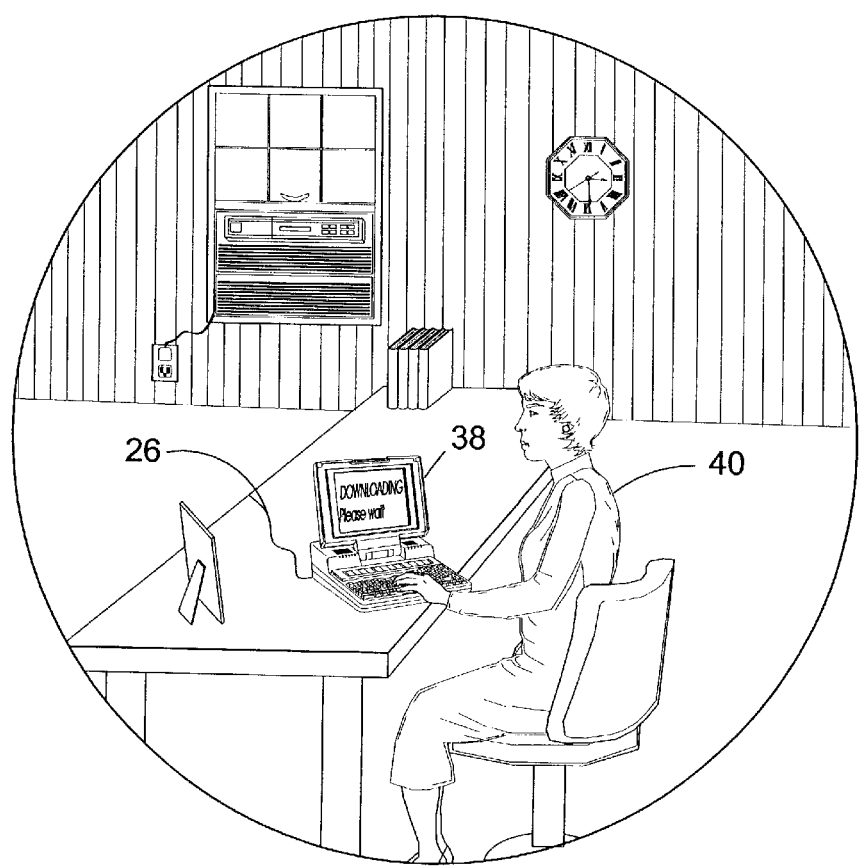
FIG. 4 is an illustrative view of the telephone circuit controller apparatus of the present invention in use disabling all other extensions so that a computer may complete an online data transfer without interference.

FIG. 4 is an illustrative view of the telephone circuit controller apparatus 10 in use disabling all other lines to allow a computer 38 to complete an online file transfer without possibility of disconnection upon picking up a receiver by another user. A modem within the computer 38 is connected to the telephone circuit controller apparatus 10 via an extension phone line 26, thus connecting the computer 38 to an outside telephone line 24 in a controlled fashion. Entry of a privacy command code, prior to dialing a server by a computer or while the computer connected to the telephone line, disconnects all other extensions 12 from the outside telephone line 24. By disconnecting other extensions 12, the user of the computer is provided exclusive access to the outside line 24. The privacy command code may be entered at the computer 38, similarly to entry on a telephone keypad 19 of a telephone 18 connected to the main housing unit 15. Previously, file transfers are disrupted and computers disconnected from telephone lines when another line is picked up. This causes incomplete transmission and confrontation between multiple users. Such inconveniences are now avoided through the use of the telephone circuit controller apparatus of the present invention 10. During connection, the computer is provided exclusive access to the telephone lines thereby allowing for uninterrupted data transfers. After the completion of the data transfer and disconnection of the computer from the telephone line, the telephone circuit controller apparatus 10 automatically reconnects other extensions to the outside line 24, thus, allowing access at a first come first serve basis.

Figure 5:
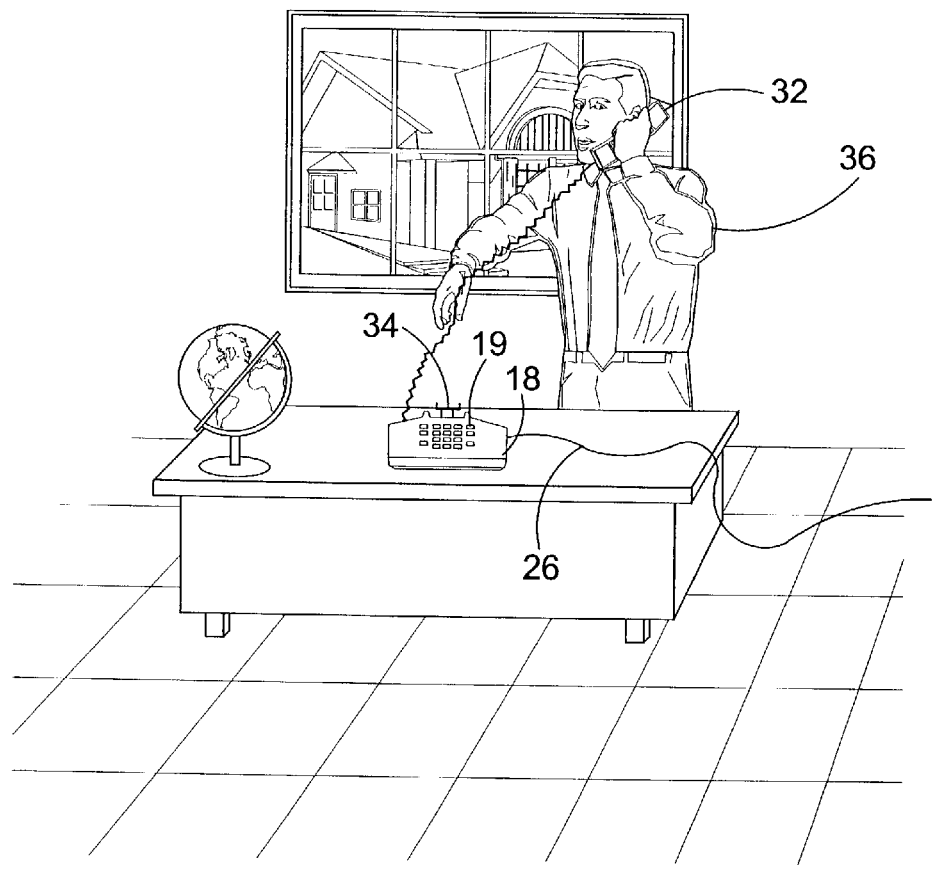
FIG. 5 is an illustrative view of the telephone circuit controller apparatus of the present invention in use disabling all other extensions in order to obtain instant access to an outside line without interruption by others enlisting use of another extension.

FIG. 5 is an illustrative view of the telephone circuit controller apparatus of the present invention 10 disabling all other extensions thereby providing exclusive access to an outside line 24. Often, important business calls are made from home requiring a heightened level of urgency and protection from embarrassing interruptions. Thus, it is important that the user be provided instant and exclusive access to an outside line 24 thereby preventing interruption by others attempting to use the telephone. Entry of an emergency disabling command code on the telephone keypad 19 of the programmer's telephone 18 sends a command signal to the telephone controller apparatus 10 via the connected extension line 26. The signal representative of the emergency disabling command code controls the telephone circuit controller apparatus 10 to disable all other extensions of the outside line 24 while connecting the telephone from where the command signal was entered to the outside line 24. This allows the programmer 36 instant and exclusive access an outside line 24. If a user at another extension has entered a privacy command code and occupies the outside line, entry of the emergency disabling command code will override the privacy command code and provide exclusive use to the programmer 36 that has entered the emergency code. At termination of the emergency telephone call, the programmer 36 places the telephone 18 in the on hook position 28. This sends a command signal to the telephone circuit controller apparatus 10 to automatically reconnect all extensions to the outside line 24 thus, allowing access at a first come first serve basis.

Figure 6:
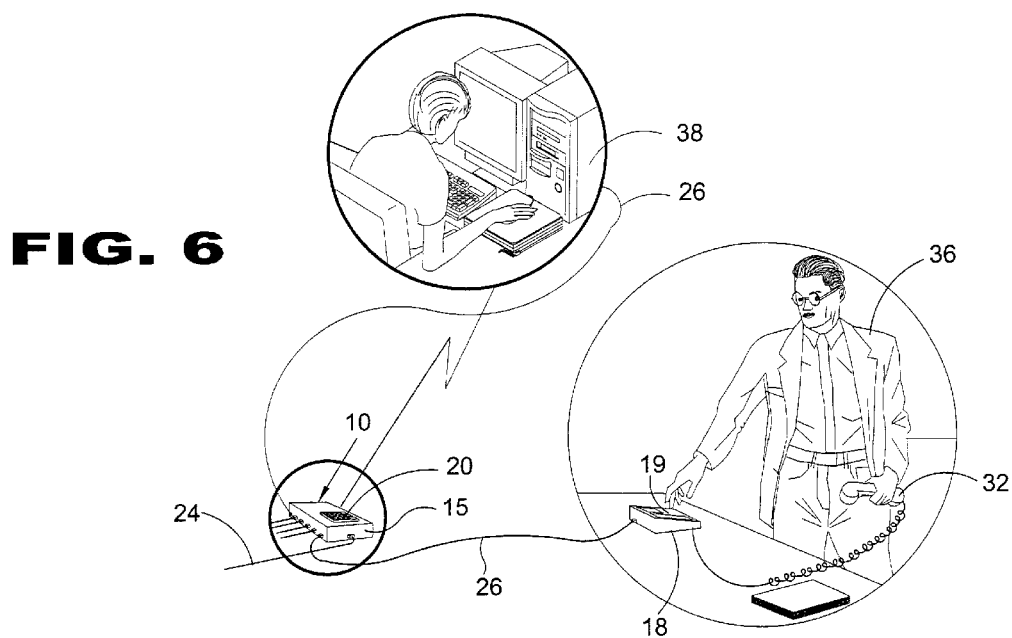
FIG. 6 is an illustrative view of the telephone circuit controller apparatus of the present invention in use disabling an online computer from accessing the outside line.

FIG. 6 is an illustrative view of the telephone circuit controller apparatus of the present invention 10 in use disabling an online computer 38. The telephone circuit controller apparatus 10 is a device containing a code keypad 20 by which multiple extensions 12 can be connected to an outside line 24 in a controlled fashion. Entry of a programmable code allows a programmer 36 to control the use of all extensions connected to the telephone circuit controller apparatus 10. One such controlling function is to disable an online computer 38 upon entry of a designated disabling command code. Entry of the disabling command code controls the circuit controller apparatus to disable all extensions except for the extension from which the command code was entered or a selected extension specified by an identifying program code. Additionally, the programmer 36 can place a timer upon an extension's use by entering an alternate code. This allows the programmer 36 to curtail the amount of time spent online by family members. The process for disabling a computer connected to the circuit controller apparatus 10 is to that described with respect to FIG. 3 for disabling a telephone 18. Additional functions specific to controlling a computer 38 connection may also be invoked. If the computer 38 is known to always be connected at a certain extension, a timing function may be tailored to allow specific users certain time limitations at that particular extension. The circuit controller apparatus can monitor the total online use of the computer by tallying the total time of using the computer 38 by each user at the particular extension. Monitoring the timing function in such a manner allows users to budget internet use to fall within monthly billing plan limitations set by the internet provider and internet user plan chosen. This also allows for each user to be held responsible for their respective use of the online service.

Figure 7:
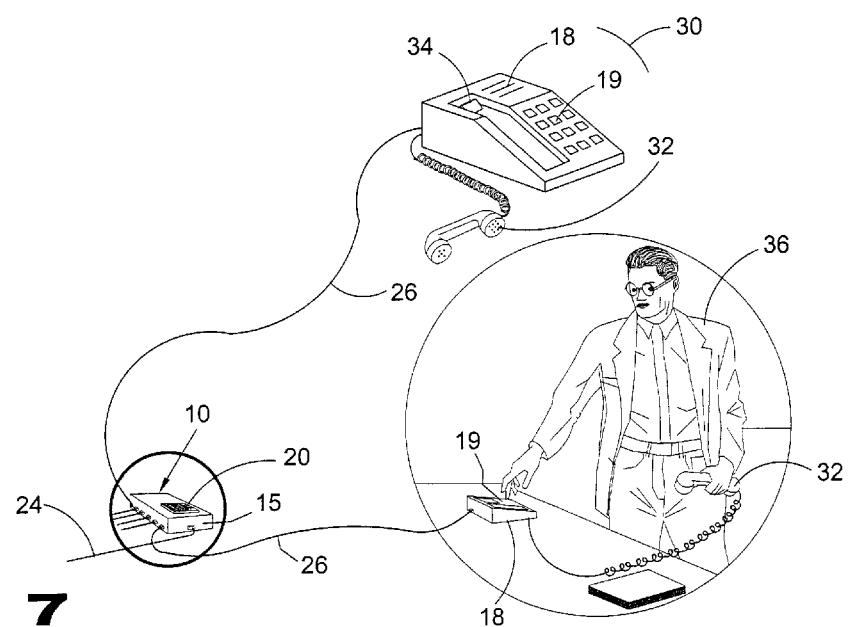
FIG. 7 is an illustrative view of the telephone circuit controller apparatus of the present invention in use disabling an extension occupied by a communication device inadvertently left in the off-hook position.

FIG. 7 is an illustrative view of the telephone circuit controller apparatus 10 in use disabling an extension 12 connected thereto. In this instance the outside line 24 is occupied by an extension 12 connected to a telephone 18 inadvertently left in the off hook position 30. Entry of a designated disabling command code by the programmer 36 into the circuit controller apparatus 10 via the telephone keypad 19 provides the programmer 36 with access to an outside phone line 24 by disconnecting all other extensions, including the extension 14 having a telephone 18 left in the off-hook position 30. The telephone circuit controller apparatus 10 also provides all other phone extensions 12 access to an outside line 24 once the programmer 36 ceases use by placing the phone in the on-hook position 30.

Additionally, the telephone circuit controller apparatus 10 may be programmed to automatically disconnect a particular extension connected to a telephone 18 inadvertently placed in the off-hook position 30. The telephone circuit controller apparatus of the present invention 10 is capable of detecting a phone in the off-hook position 30 and upon detection, activate a timing function to disconnect the extension. If the off-hook telephone 30 remains inactive for the duration of the timing sequence, the respective extension will be disabled at the expiration of the designated time period. Disconnecting the off-hook telephone 30 from the main line 24 allows other devises to receive a dial tone from the main line 24. The remaining extensions, which are connected to the outside line 24, are now allowed access at a first come first serve basis.

Figure 8:
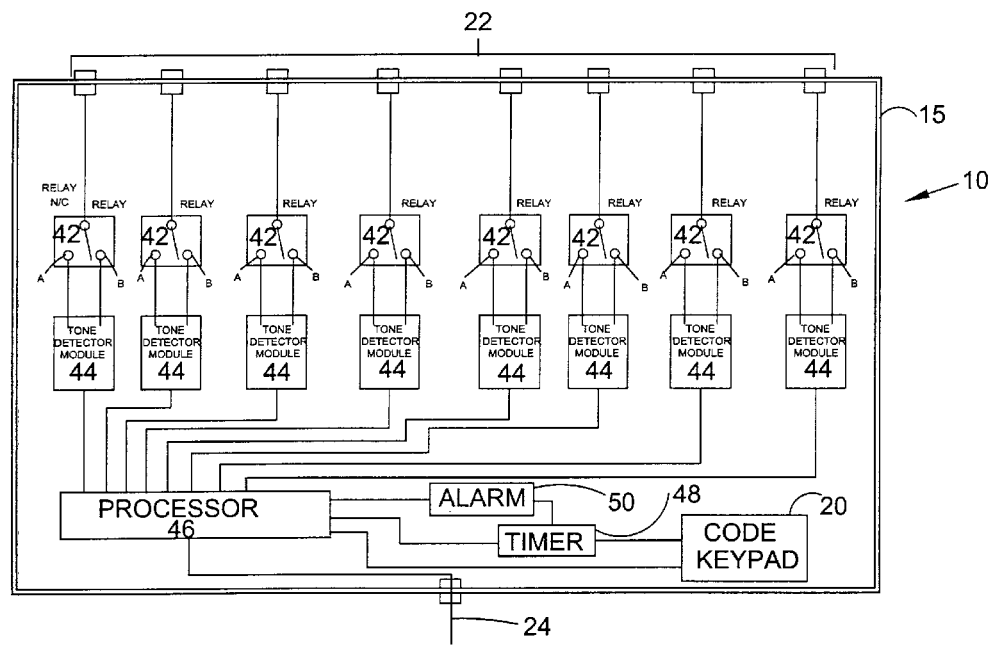
FIG. 8 is a block diagram of the components of the telephone circuit controller apparatus of the present invention.

FIG. 8 is a block diagram of the components of the telephone circuit controller apparatus of the present invention 10. The components of the telephone circuit controller apparatus 10 are contained within a main housing unit 15. On one face of the main housing unit 15 are a plurality of extension connector ports 22 through which various communication devices are connected to the circuit controller 10. A plurality of relay switches 42 are also contained within the main housing unit 15. Each relay switch 42 is connected to a respective one of the plurality of extension connector ports 22. Each relay switch 42 includes an input terminal connected to the respective A and B relay terminals. Each relay switch 42 is connected to a respective tone detector module 44 at terminal A and terminal B. The tone detector module 44 detects whether the communication device attached thereto is in the on-hook or off-hook position by comparing a voltage differential between terminals A and B. Terminal A is connected to a constant voltage source equivalent to the voltage created by a telephone 18, or other communication device, in the on-hook position 28. When contacting terminal A, the tone detector module 44 is blocked from detecting a connected communication device being placed in the off-hook position 30 by the voltage source. When the relay switch 42 is connected to terminal B a voltage created by the connected communication device, is provided to the tone detector module 44. If the phone is in the off hook-position 30, while terminal B is contacted, the tone detector module 44 detects the voltage differential created and sends a signal to the processor 46 identifying the extension as being in the off-hook position 30. Each tone detector module 44 is connected to the processor 46 for processing command signals. The processor is connected to the main line 24. The processor 46 connects any extension not in the on hook position to the main outside line 24. The tone detector module 44 sends command signals to the processor 46 representative of voltage differences between terminal A and terminal B or representative of command codes entered on the various communication devices attached at the extension connector ports 22. The processor 46 is also connected to a code keypad 20 from which command signals may also originate. The code keypad 20 is positioned on a face of the main unit 15 for receiving user input command codes. The processor 46 controls the switching of the relay switches 42 in response to program command codes inputted to the processor 46 by the telephone keypads 19 and the code keypad 20.

A timer 48 is connected to the code-keypad 20 and the processor 46. The timer 48 is controlled by the code keypad 20. A prescribed user may activate the timer 48 by imputing a designated timer code on the code keypad 20, which sends a command signal to the timer 48. The user may additionally input a time period on the code keypad 20 for the timer 48 to count. The timer 48 provides a signal to the processor 46 at the termination of a time period entered by a user on the connected code keypad 20. An audible alarm 50 is also connected to the processor 46. The alarm 50 is selectively connected to any of the plurality of extensions via the processor 46. The alarm 50 is also connected to the timer 48 so that the alarm 48 can be activated by a signal generated by the timer 48 at the expiration of a timing sequence. The processor 46 controls the alarm 50 based on command signals received from the tone detector modules 44 and the code-keypad 20. Dependent upon the command signal received by the processor 46, the alarm 50 may provide different and unique audiblre signals for each particular situation encountered. For example, a unique audible alarm signal may be generated to identify an occupied extension to disabled users. Alternatively another unique audible alarm signal may be generated to indicate to a user a time period remaining before disconnection by the relay switch 42.

Figure 9:
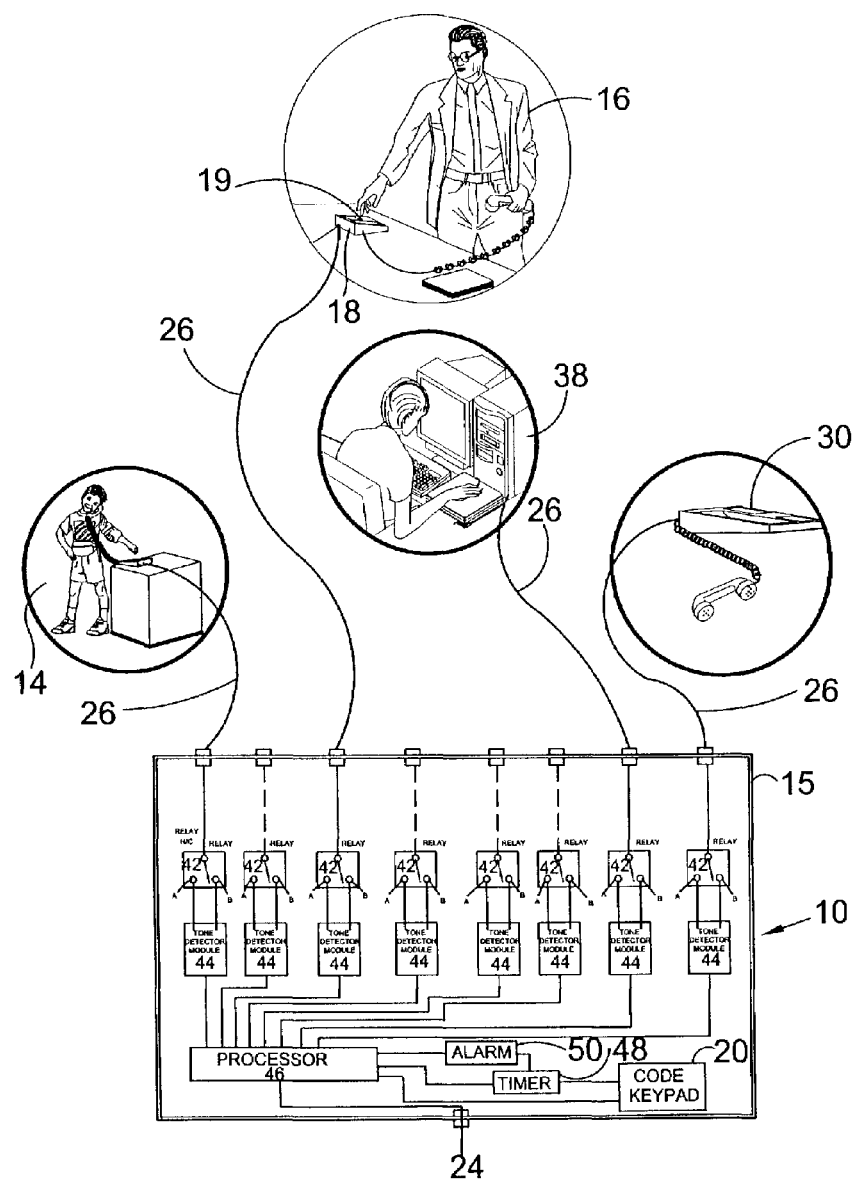
FIG. 9 is a functional diagram of an on-hook signal and an off-hook signal being sent to the processor of the telephone circuit controller apparatus of the present invention.

FIG. 9 is an illustrative view of the telephone control apparatus 10 in use disconnecting occupied extensions to give an otherwise disabled user 16 access to an outside line 24. A dial tone or connection to an incoming call is provided when the local phone company detects a signal on the main line 24 representative of a telephone placed in the off-hook position 30. If a user placing a call or transferring a file from a computer 38 occupies an extension, another user is unable to do the same because the phone company detects the outside line 24 is already occupied. The same is true if a telephone remains in the off-hook position 30 for an extended period of time, because the phone company stops sending a dial tone after detecting non use of the supplied dial tone for an extended period of time. Illustrated are solid lines connecting the relay switch 42 and tone detector module 44 of extensions that are carrying voltages representative of a phone in the off-hook position 30 to the processor 46. The dashed extension lines illustrate an extension line carrying a voltage representative of a phone in the on hook position 28 to the processor 46. Extension connector ports 22 which are not connected to a communication device carry the same voltage as an extension connector port 22 connected to a device in the on hook position 28.

For a disabled user 16 to access the outside line 24, the disabled user 16 must enter a disable command code to the processor 46. The command signal controls the processor 46 to switch all remaining relay switches 42 to terminal A. By switching to terminal A, all remaining extensions are provided with a voltage equivalent to an on-hook voltage. When contacting terminal A, the connected voltage source prevents the tone detector module 44 from detecting a connected communication device placed in the off-hook position 30. The connected tone detector modules 44 send a signal to the processor 46 representative of a phone in the on hook position 28. The processor 46 is programmed to connect only those extensions in the off-hook position 30 to the main outside line 24. The remaining extensions now resemble the extensions illustrated with dashed line connections; thus, the processor 46 disconnects all remaining extensions perceived to be in the on hook position 28 from the main outside line 24. The extension from which the disable command code originated remains connected to the main outside line because it is in the off-hook position 30 and connected to terminal B. This extension receives a dial tone and is also capable of dialing out.

Figure 10:
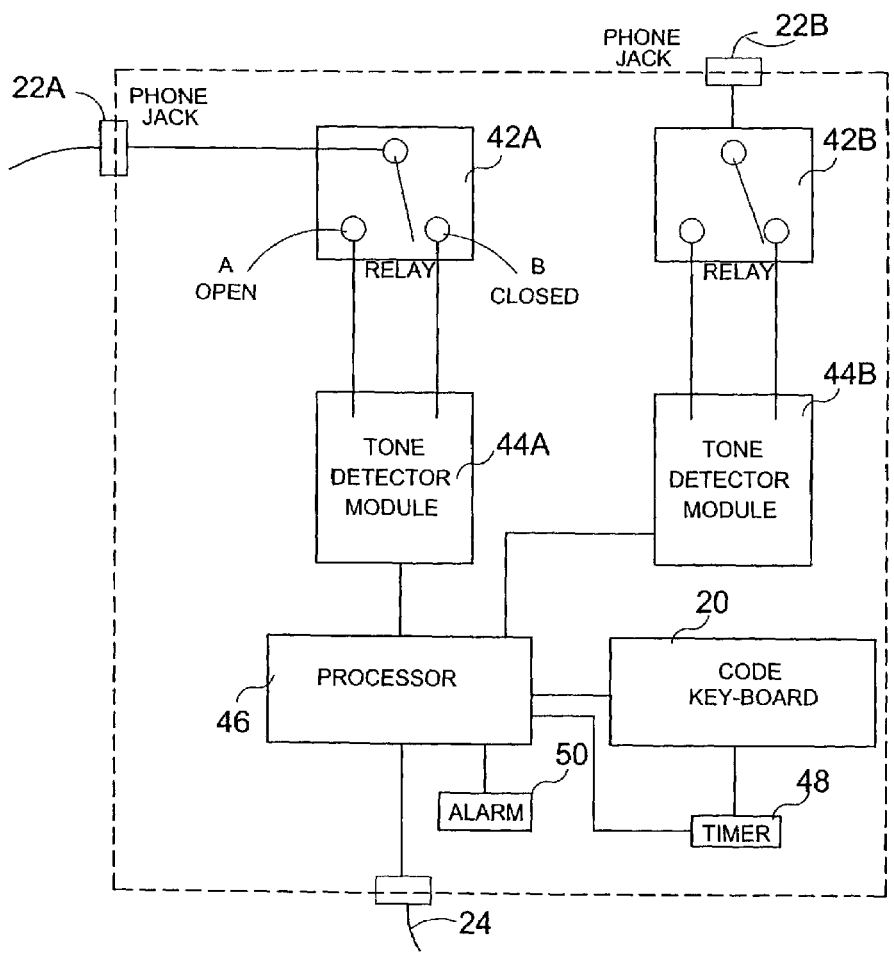
FIG. 10 is a block diagram of the components of the telephone circuit controller apparatus of the present invention in use disconnecting an occupied extension from the outside line 24 for use by an otherwise disabled user.

FIG. 10 is a block diagram illustrating the interconnection of elements upon disconnection of an occupied extension 22B from the main outside line 24 upon input of a control command at a second extension 22A. This figure shows two extensions connected to the main outside line 24. The illustration of two extensions is for purposes of example. Incorporation of additional extensions does not affect the method of use. The processor 46, based upon the entered command signals, controls any additional extensions. Illustrated is an occupied extension 22B connected to the outside line 24 through the processor 46. Placing an attached communication device in the off-hook position sends a signal to the processor 46 via the relay 42B and tone detector module 44B to connect the device to the main line 24. Thus, a desired user would hear the conversation of the occupied user 22B if placing the respective phone 22A in the off-hook position 30. This occurs because the extension 22B is connected to the main line 24 and is thus restricting other extensions 22A from placing a telephone call. However, the disabled user 22A is able to clear the connection with the outside line 24 by disabling the occupied extension 22B. A disable command code entered on the code keypad 20 sends a command signal to the processor 46 to control the relay switch 42B from terminal B, to terminal A. Similarly, the disable command code may be entered on the telephone keypad 19 of the disabled user's telephone. The command signal entered on the keypad 19 is sent through the relay switch 42A and tone detector module 44A to the processor 46. The placement of the relay switch 42A at terminal A or B has no bearing on user's ability to send command signals to the processor 46. Rather, the terminal connection of the relay switch 42A or 42B determines whether the particular extension is connected to the outside line 24. When positioned at terminal B the connected tone detector module 44B detects the voltage supplied by the attached communication device. If placed in the off-hook position, the tone detector module 44B detects the voltage differential in comparison to terminal A. The tone detector module 44B sends a signal to the processor to connect to the main line 24. Switching the relay switch to terminal A disconnects the extension from the main line 24. Terminal A provides the tone detector module 44B with a voltage equivalent to an on-hook voltage. The processor 46 is connected to the tone detector module 44A. Each tone detector module sends a command signal to the processor representative of the occupied extension being in the on-hook position when the respective telephone is not in use. The processor 46 disconnects telephones in the on hook-position from the main outside line 24 much as the local phone company perceives the voltage similarity as a terminated call and provides the main line 24 with a new dial tone. Because the formerly disabled extension 22A remains connected to terminal B, the dial tone is received and a telephone call can be placed at that extension. Once the call is completed, returning the telephone to the on-hook position signals the processor to toggle all relay switches to, contact terminal B.

Figure 11:
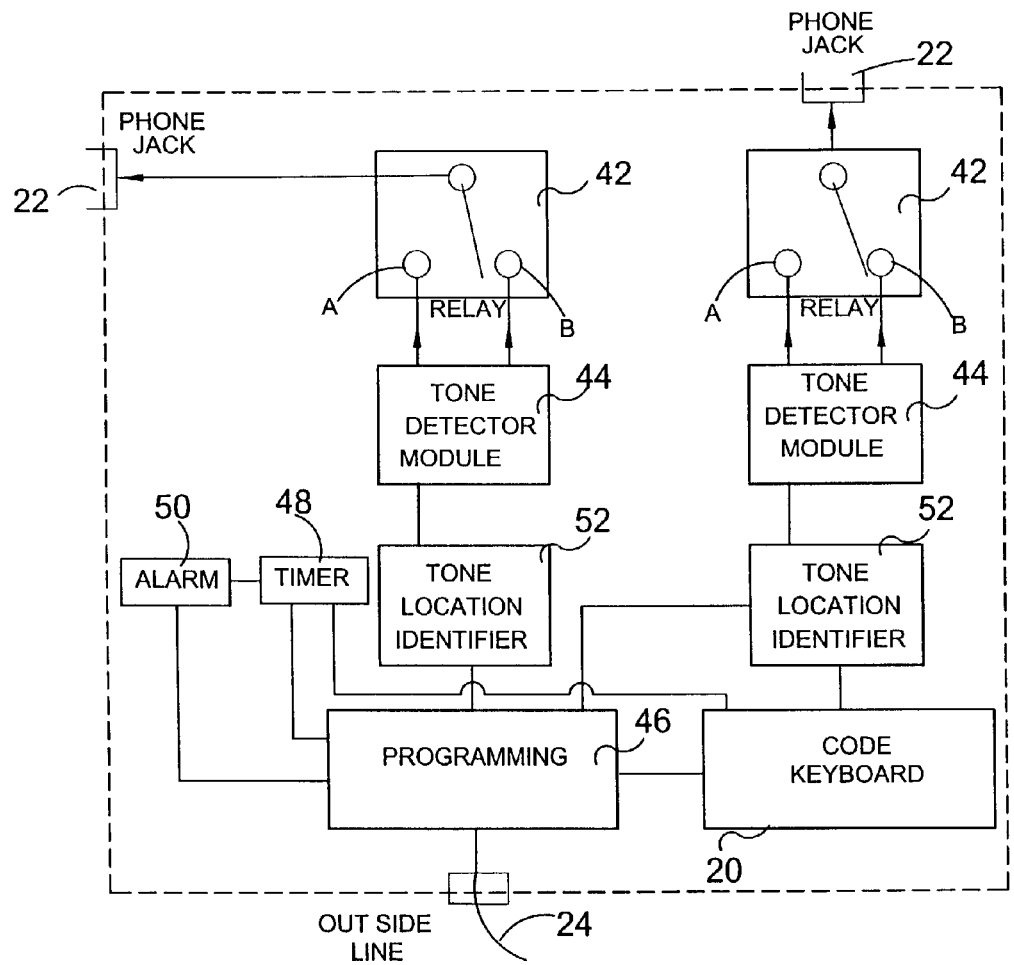
FIG. 11 is a block diagram of the components of the telephone circuit controller including a tone identification locator.

FIG. 11 is a block diagram of the extension connector ports 22 of the telephone circuit controller apparatus of the present invention 10 connected to a processor 46 via a tone location identifier 52. The command signal sent from one of a plurality of extensions 22 enters the processor 46 through a tone location identifier 52. Each tone detector module 44 is connected to a respective tone location identifier 52. The tone location identifiers 52 receive a command signal representing a state of its respective extension and direct the command signal to the processor 46 with an identifying signal designating the extension. The processor 46 processes the signal received by the tone location identifier 52. When an extension is occupied, the respective tone location identifier 52 provides the processor 46 with a command signal to control the alarm 50. The processor activates the alarm 50 to generate an audible signal able to be heard at in all extensions other than the occupied extension. The alarm 50 provides an indication to any other extension in the off-hook position as to the location of the occupied extension. This allows users of disabled extensions to identify the extension controlling the line, and either keep note of the use or manually disable the extension if desired. Additionally, being able to individually identify each extension allows each extension to be separately controlled by a timing function.

The operation of the telephone circuit controller apparatus of the present invention 10 will now be described with reference to FIGS. 1 through 11. A plurality of existing communication devices such as a telephone 18, fax machine, or computer modem 38 are selectively connected to a single, outside line 24 through the telephone circuit controller apparatus 10. In order to set up the apparatus for operation, each communication device is separately connected to an extension connector port 22. The manufacturer can prescribe the number of extension ports, or a predetermined number may be assigned thereto. The main outside line 24 is additionally connected to the main unit 15, as illustrated in FIG. 2. Once connected to the main unit 15, a user, programs unique identifying codes for each user and each extension using the code-keypad 20. Command codes to be used in conjunction with the identifying codes are pre-programmed in the processor 46 of the main unit 15. Such functions include, but are not limited to, a disabling function, a privacy function, timing function, and emergency connection function. Additionally, through the use of personal identifiers, users can be prescribed ranks of overriding authority, for example a parent may self prescribe priority levels which restrict or provide access to certain features.

Each extension 26 is connected to the outside line 24 via a relay switch 42, a tone detector module 44 and a processor 46. The relay switch 42A is normally in the closed position contacting terminal B. When in this position, the tone detector module 44 is capable of detecting when the attached communication device is placed in the off-hook position 30 by monitoring a voltage differential between terminal A and terminal B. A voltage difference detected by the tone detector module 44 is sent to the processor 46 for processing. Based on the value of the voltage difference, the processor connects the particular extension to the outside line 24. If no voltage difference between terminals A and B is detected, the processor 46 is sent an on-hook signal from the tone detector module 44 disconnecting the particular extension from the outside line 24.

Initially, every extension is capable of connecting to the outside line 24 by positioning the attached communication device in the off-hook position 30. However, only one device may control the outside line 24 at any given time. If a user desires to use the main line 24 without interruption by other extensions, the user enters a privacy command code using the telephone-keypad 19 of the user's communication device. The telephone keypad 19 sends a signal representative of the entered code to the processor 46 via the relay 42 and tone detector module 44 for processing. The signal representative of the privacy command code controls the processor 46 to open all remaining relay switches 42 except for the extension from which the command code originated, thereby disconnecting the remaining extensions. The processor 46 is also controlled to poll the extension from which the command code originated for an on-hook signal. By doing so, the placement of all remaining communication devices in the off-hook or on-hook position is not detected by the attached tone detector modules 44, rather, the tone detector modules 44 are sent a voltage equivalent to a telephone in the on hook position 28 by terminal A. Then, the tone detector modules 44 send an on-hook signal to the processor 46 for processing. Perceived to be in the on-hook position 28 by the processor 46, all remaining lines are disconnected by the processor 46 from the main line 24. The immediate disable command-code performs the same function, but rather, the command code is entered by an otherwise disabled user. The disable command code immediately cuts short any use of the main line 24 by other extensions, enabling the extension from which the command was entered to access a dial tone. In both instances, the relay switches 42A of all remaining extensions are returned to the closed position when the processor detects an on-hook signal from the toned detector module 44 of the extension from which the command code originated. Privacy disable command codes may be entered in conjunction with personal identifier codes. A personal identifier code is unique to each user. Different users could be given different clearance levels, with ultimate clearance overriding any other user's ability to control the main line 24. An emergency disable command code is an example of an overriding command code. The emergency disable command code disables all remaining extensions, even if an occupied extension has invoked the privacy command disabling all remaining extensions, because the emergency disable command code is given a high level of clearance overriding all prior input commands.

Further disabling functions may be performed in conjunction with a timing function. As opposed to immediate disabling of an occupied extension, a programmer may incorporate a timing sequence, providing an opportunity for the occupied extension user to complete the desired use before being abruptly disconnected. Entering a disable command code in conjunction with a timing command code signals the processor 46 to activate the timer 48. The timer 48 counts down from or up to, depending upon the timer used, the time limit specified in the timing command code. After completing the count, the timer 48 sends a signal to the alarm 50 activating a warning alarm. The processor 46 selectively connects the alarm 50 to all remaining extensions. The alarm will announce to all remaining extensions of a predetermined time remaining for use of the outside line 24. The timer 48 counts the predetermined time and upon expiration of the predetermined time sends a termination signal to the processor 46. Upon receipt of the termination signal, the processor 46 controls the relay switches 42 of all remaining extensions to switch to the open position. The remaining extension are thus disconnected from the main line, as described earlier, and reconnected once the extension from which the disable command code originated is returned to the on-hook position 28.

Additionally, each extension can be separately controlled if connected to the processor 46 through a tone location identifier 52. The tone location identifier 52 places a unique identifying signal on the tone provided by each extension to the processor 46. A tone location identifier used in conjunction with personal identifier codes enables a user to restrict selective users form selective extensions. A programmer 36 can program the processor 46 to restrict access to specified user's at selected extensions by entering programming command codes on the code keypad 20. Entry of a restricted personal identifier code on a telephone keypad of a communication device connected to the restricted extension signals a processor 46, programmed with restricted access, to control the connected relay switch 42 to switch to the open position. Thus, disabling the extension from accessing the outside line 24. The program additionally controls the processor 46 to activate the timer 48. The timer 48 counts a predetermined time sequence and sends a termination signal to the processor 46 upon expiration of the predetermined time. Upon receiving the termination signal the processor 46 controls the relay switch 42 of the restricted extension to switch back to the closed position.

The signal sent to the processor 46 by the tone location identifier 52 may also be used to alert all remaining extension of an occupied extension line. When an extension is occupied, the processor 46 sends a signal to the alarm 50. The command signal incorporates the tone location identifier controlling the alarm to play an audible alarm specifying the occupied extension identified by the tone location identifier 52. The processor 46 sends this audible signal to all remaining extensions, so that upon placing a remaining extension in the off-hook position 30 the user will hear the alarm identifying the occupied extension. Placing the occupied extension in the on-hook position 28 signals the processor 46 to disconnect from the respective extension from the outside line 24 and disable the alarm 50.

Often, internet providers charge on a per hour basis. By selectively controlling an extension connected to a computer 38, the programmer 36 can avoid excessive internet use and the resultant large charges. The processor 46 can be programmed to activate the timer upon receiving an off-hook signal from an extension connected to a computer 38, identified by the tone identification locator 52. The processor 46 signals the timer 48 to count a time period corresponding to an entered personal identifier code or a pre-established time period established for the extension to be used in one sitting. Upon receiving a termination signal from the timer 48, the processor 46 controls the relay switch 42 to switch to the open position thus disabling the computer 38 extension. Any extension may be selectively controlled in such a manor through the use of the telephone circuit controlling apparatus 10. Limiting internet use is only one such example of its utility.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A telephone circuit controller apparatus comprising:
   a) a plurality of extension connector ports each selectively connected to a respective communication device;
   b) a plurality of relay switches, each relay switch having first, second and third terminals and a toggle movable between a first position connecting said first terminal to said second terminal and a second position connecting said first terminal to said third terminal, said first terminal of each said plurality of relay switches being connected to a respective one of said plurality of extension connector ports; and
   c) a processor connected to an outside telephone line wherein entry of a predetermined command code on one of the communication devices by a user causes said processor to move selective ones of said toggles from said first position to said second position thereby preventing use of the communication device connected to said selective ones of said toggles through a respective one of said plurality of extension connector ports;
   d) a plurality of tone detector modules, each of said plurality of tone detector modules being connected between said processor and said second and third terminals of a respective one of said plurality of relay switches, said plurality of tone detector modules generating a command signal controlling said processor to connect a respective extension to the outside telephone line when a voltage detected thereby is equivalent to a predetermined voltage; and
   e) a plurality of tone location identifiers, each of said plurality of tone location identifiers being connected between said processor and a respective one of said plurality of tone detector modules, said plurality of tone location identifiers being activated upon receipt of a control signal from said respective tone detector module for generating a unique signal by which said processor distinguishes said plurality of extension connector ports.

2. The telephone circuit controller apparatus as recited in claim 1, wherein each of said communication devices provide a first signal representing a communication devices in an off-hook position to a respective one of said plurality of tone detector modules when said toggle is in the first position, and a second signal representing a communication device in an on-hook position to a respective one of said tone detector modules when said toggle switch is in the second position.

3. The telephone circuit controller apparatus as recited in claim 2, further comprising a timer connected to said processor for counting a predetermined time period, said timer being activated upon entry of a command code on one of the communication devices for generating a command signal controlling said processor to move said toggle of a selected one of said plurality of relay switches form the first position to the second position upon expiration of the predetermined time period.

4. The telephone circuit controller apparatus as recited in claim 2, further comprising a timer connected to said processor for counting a predetermined time period, said timer being activated by the processor upon receipt of an off-hook signal from one of said tone detector modules, whereby, upon expiration of said predetermined time period, said timer sends a control signal to said processor for moving said toggle of one of said plurality of relay switches identified by a respective one of said plurality of tone location identifiers to said second position.

5. The telephone circuit controller apparatus as recited in claim 4, wherein said processor controls said plurality of relay switches to return to said first position upon receipt of a command signal representing that the attached communication device which provided the initial disable command is returned to the on-hook position.

6. The telephone circuit controller apparatus as recited in claim 2, further comprising an alarm connected to said processor for generating a unique audio signal representing each of said plurality of extension connector ports.

7. The telephone circuit controller apparatus as recited in claim 6, wherein said processor causes said alarm to generate an audible alarm signal indicating a time period remaining before said predetermined time period expires and said processor disables selected extension.

8. The telephone circuit controller apparatus as recited in claim 2, wherein said predetermined command code includes a personal identification signal, said personal identification signal being unique to each user.

9. The telephone circuit controller apparatus as recited in claim 8, wherein each personal identification signal provides the user with a predetermined priority user status.

10. The telephone circuit controller apparatus as recited in claim 1 further comprising an alarm connected to said processor for generating audio alarm signals, upon receipt of an off-hook signal by said processor from one of said plurality of tone detector modules.

11. The telephone circuit controller apparatus as recited in claim 1, wherein, each communication device is one of a fax machine, a computer modem and a telephone.

12. The telephone circuit controller apparatus as recited in claim 1, wherein the predetermined command code includes a plurality of digits, wherein one of the digits specifies a degree of priority for the user, the priority of the user determining the ability of the user to override previously input command codes.

* * * * *